United States Patent
von Glowczewski et al.

(10) Patent No.: US 6,923,046 B2
(45) Date of Patent: Aug. 2, 2005

(54) ARRANGEMENT AND METHOD TO MEASURE CYLINDER PRESSURE IN A COMBUSTION ENGINE

(75) Inventors: Manfred Klopotek von Glowczewski, Södertälje (SE); Grover Zurita Villarroel, Cochabamba (BO)

(73) Assignee: Scania CV AB (publ) (SE)

( * ) Notice: Subject to any disclaimer, the term of this patent is extended or adjusted under 35 U.S.C. 154(b) by 37 days.

(21) Appl. No.: 10/473,559

(22) PCT Filed: Mar. 28, 2002

(86) PCT No.: PCT/SE02/00647
§ 371 (c)(1),
(2), (4) Date: Dec. 12, 2003

(87) PCT Pub. No.: WO02/084245
PCT Pub. Date: Oct. 24, 2002

(65) Prior Publication Data
US 2004/0118182 A1 Jun. 24, 2004

(30) Foreign Application Priority Data
Mar. 30, 2001 (SE) .............................................. 0101144

(51) Int. Cl.$^7$ .............................................. G01M 15/00
(52) U.S. Cl. .................. 73/115; 73/35.09; 73/35.12; 73/117.3
(58) Field of Search .............................. 73/35.01, 35.07, 73/35.09, 35.11, 35.12, 35.13, 112, 115, 116, 117.2, 117.3; 701/29, 99, 101, 111

(56) References Cited
U.S. PATENT DOCUMENTS 4,483,179 A * 11/1984 Oshima et al. ............ 73/35.13
4,584,869 A * 4/1986 Frodsham .............. 123/406.38
4,640,250 A * 2/1987 Hosaka et al. ......... 123/406.35
4,991,553 A * 2/1991 Kurihara et al. ....... 123/406.37

FOREIGN PATENT DOCUMENTS

| | | |
|---|---|---|
| DE | 3029838 | 4/1982 |
| DE | 3506114 | 9/1986 |
| DE | 19742006 | 3/1999 |
| EP | 0671619 | 9/1995 |
| EP | 0922947 | 6/1999 |

* cited by examiner

Primary Examiner—Eric S. McCall
(74) Attorney, Agent, or Firm—Ostrolenk, Faber, Gerb & Soffen, LLP

(57) ABSTRACT

The pressure in a cylinder of a combustion engine is determined on the basis of vibrations in the engine which are generated during movement of the piston. A vibration signal (S) from a vibration sensor situated on a cylinder is filtered in the region about the piston top dead center position, at the transition from compression to expansion, in a special filter in which a half Hanning filter acts upon the vibration signal before and an exponential filter acts upon the vibration signal after the piston top dead center position. The filtered signal (U) is thereafter converted to a pressure signal (P) on the basis of an established relationship between vibration and pressure. The half Hanning filter has a significantly shorter time window ($T_H$) than the exponential filter ($T_E$). The filter cleans the vibration signal in an advantageous manner and makes more reliable pressure determination possible.

20 Claims, 1 Drawing Sheet

ARRANGEMENT AND METHOD TO MEASURE CYLINDER PRESSURE IN A COMBUSTION ENGINE

TECHNICAL FIELD

The invention relates partly to a method for determining the pressure in a cylinder of a combustion engine by conversion of a vibration signal into a pressure measurement, and partly to an arrangement for determining the pressure in a cylinder of a combustion engine, using a vibration signal.

STATE OF THE ART

In a combustion engine it is possible for cylinder pressure to be used for obtaining important information about the combustion process in the engine, but also for ascertaining the condition of the engine. Information about cylinder pressure can therefore be used to monitor the engine and detect any malfunctions.

Determining the pressure in a cylinder can be done by means of a pressure sensor fitted in, for example, the cylinder head, but such a method is complicated and also results in the pressure sensor operating in a very difficult environment which limits its service life and reliability. There is further difficulty in organising appropriate space for fitting such a sensor. Such a solution is only suitable for laboratory use. There is therefore a great need for alternative simpler solutions to the problem of determining cylinder pressure.

According to another known solution, one or more sensors in the form of accelerometers situated on the engine has/have been used to provide information about the vibrations caused by pressure changes in a cylinder, followed by these vibrations being used as a basis for trying to represent the pressure configuration in a cylinder. The fact that engines are of complex construction has made it difficult to achieve good and reliable results in this respect. The way an original pressure signal propagates in the engine is complicated and gives rise to resonances, harmonics and other phenomena which cause problems in interpreting a vibration signal. Moreover, such factors as piston tilt, valves and adjacent cylinders may influence the vibration signal and make it difficult to interpret. Various types of filter have been tried but have not produced satisfactory results.

OBJECTS OF THE INVENTION

The object of the invention is to make it easier and more certain than previously to obtain reliable information about cylinder pressure in an engine on the basis of analysis of engine vibrations. A further object is to make this possible by simple and inexpensive means.

DESCRIPTION OF THE INVENTION

These objects are achieved by the method and apparatus of the invention. The pressure in a cylinder of a combustion engine is determined on the basis of vibrations in the engine which are generated during movement of the piston. A vibration signal (S) from a vibration sensor situated on a cylinder is filtered in the region about the piston top dead center position, at the transition from compression to expansion, in a special filter in which a half Hanning filter acts upon the vibration signal before and an exponential filter acts upon the vibration signal after the piston top dead center position. The filtered signal (U) is thereafter converted to a pressure signal (P) on the basis of an established relationship between vibration and pressure. The half Hanning filter has a significantly shorter time window ($T_H$) than the exponential filter ($T_E$). The filter cleans the vibration signal in an advantageous manner and makes more reliable pressure determination possible.

Using novel and special filtering in the analysis of a vibration signal makes it possible, according to the invention, to analyse reliably the most interesting part of a vibration signal, namely that about the piston's top dead centre position in the cylinder. The novel type of filtering makes it possible to extract a stable vibration signal which, after conversion to pressure signal, can provide reliable pressure determinations usable for determining the state of the engine.

Further advantages and features of the invention are indicated in the ensuing description and patent claims.

The invention is explained in more detail below with reference to an embodiment depicted in the attached drawings.

DESCRIPTION OF AN EMBODIMENT

Figure 1:
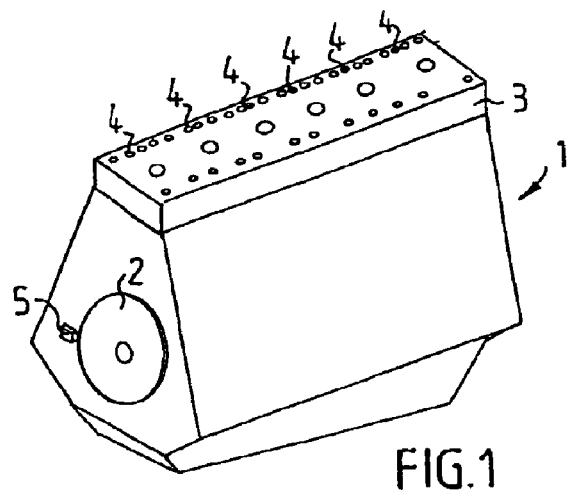
FIG. 1 depicts schematically an engine provided with vibration sensors.

FIG. 1 depicts schematically a six-cylinder diesel engine 1 which is provided with a flywheel 2 and a number of vibration sensors 4 situated on the engine's cylinder head 3, one of them for each of the engine's cylinders. The purpose of these vibration sensors 4, which are advantageously accelerometers of piezoelectric type, is to record vibrations caused by pressure pulses in the respective cylinder when the piston of the cylinder is in the vicinity of its top dead centre position at the time of transition from compression to expansion when fuel ignites in the cylinder. A position sensor 5 situated adjacent to the flywheel 2 is used to determine which of the cylinders has its piston at top dead centre position and which cylinder the recording therefore applies to.

Figure 2:
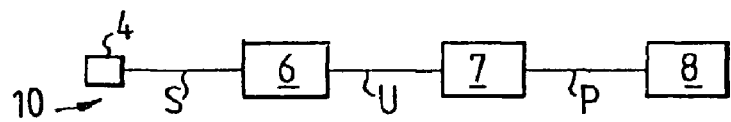
FIG. 2 depicts an arrangement for processing a signal from a vibration sensor.

During operation, complicated vibrations occurring in the engine 1 make it difficult to interpret the vibration signal. FIG. 2 depicts a suitable arrangement 10, designed according to the invention, for processing the vibration signal. A vibration signal S obtained from a vibration sensor 4 is put through a filter 6 designed according to the invention. The result is a weighted vibration signal U which is put through a module 7 which converts it to a pressure signal P which represents the way the pressure in the particular cylinder varies during the piston's movement about the top dead centre position. This pressure signal P is stored in a register 8 for subsequent analysis.

Figure 3:
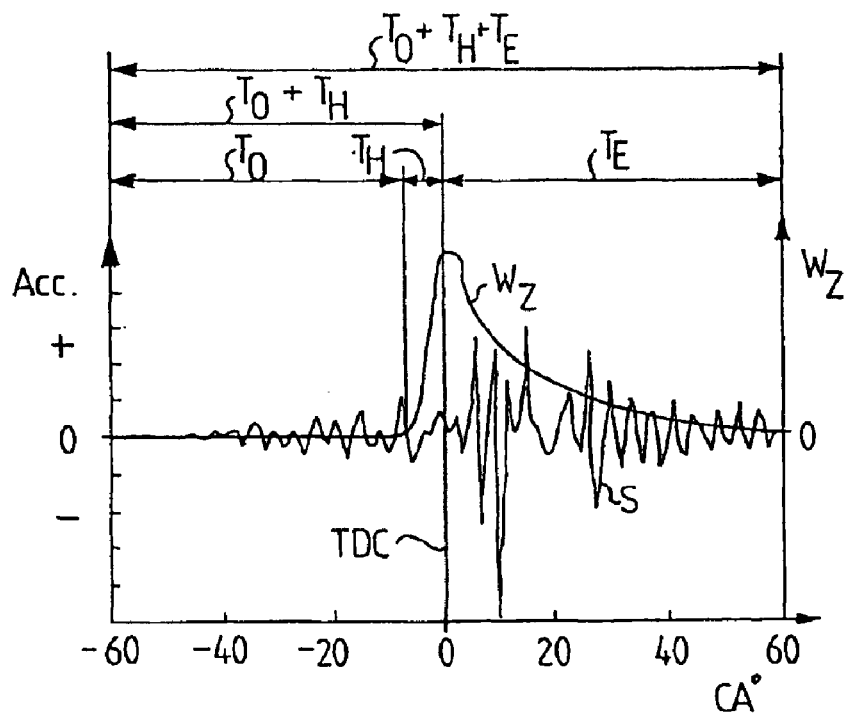
FIG. 3 depicts a diagram of a vibration signal and a filter function.

FIG. 3, in which the horizontal axis represents the crankshaft angle and the left vertical axis the measured acceleration, shows how a vibration signal S varies in magnitude and frequency about the piston's top dead centre (TDC) position, which is denoted by a vertical line at crankshaft angle (CA) value zero. This vibration arises partly from compression during the piston's upward movement and partly from pressure pulses due to fuel ignition. The vibration signal S is only of interest here during a limited part of each crankshaft revolution, and examination of this example is limited to a region between an angle of about 60° before the TDC position and a similar angle after the TDC position, making a total of about 120°. A larger or smaller region may of course be adopted as necessary.

The filter 6 thus brings about a so-called weighting of the vibration signal. The weighting function applied $W_z(t)$ is depicted as a curve $W_z$ in FIG. 3, according to the right vertical axis. In the region indicated, this weighting function has three different sections $T_O$, $T_H$ and $T_E$, where sections $T_O$ and $T_H$ together are the same length as section $T_E$, resulting in symmetry about the TDC position. The weighting function $W_z(t)$ may be written as follows:

$$W_z(t) = [\text{Zero\_Padding}, W_H(t), W_E(t)] \quad (1)$$

In this equation, Zero_Padding represents section $T_O$, in which the function $W_z(t)$ has the value zero. The functions $W_H(t)$ and $W_E(t)$ may be expressed as follows:

$$W_H(t) = 2\sin^2(2\pi t)/T_H \quad (2)$$

$$W_E(t) = e^{-(t+t_o)/\tau} \quad (3)$$

where $0 [t'T_H$ in equation (2), $0 [t'T_E$ and $t_o=0$ in equation (3) and $\tau$ is a time constant which is proportional to $T_E$.

Section $T_H$, with the function $W_H(t)$, constitutes a half Hanning window, the length of which here amounts to about 10–20%, advantageously about 15%, of the length of section $T_E$, which constitutes an exponential window. These filter types and filter functions are of standard types well known per se and are therefore not discussed in more detail in this context. Combining a half Hanning window with an exponential window as above results in good isolation of the vibration signal in the region about the piston's TDC position, thereby making it much easier to establish on the basis of a vibration signal a reliable relationship with the pressure in the cylinder. The proportions between the various sections $T_O$, $T_H$ and $T_E$ may be varied to some extent within the scope of the invention.

Sections $T_O$ and $T_H$ together cover the compression portion of the vibration signal, section $T_O$ being used for eliminating the effect of nearby cylinders, and section $T_H$ provides a good compromise between frequency resolution and reduced leakage. Section $T_E$ covers the combustion pressure and may minimise leakage error in the case of weakly damped signals and may also improve the ratio between signal noise and noise in the case of powerfully damped signals.

Conversion from vibration signal U to pressure signal P in the module 7 requires knowledge of a relationship between vibration signal and pressure. Such a relationship can be established by ascertaining, during continuous vibration measurement, the pressure prevailing in a cylinder, which can be done by using, for example, a pressure sensor fitted in the cylinder head to detect and continuously record the pressure in the cylinder. In this respect it has been found advantageous to achieve greater precision by putting the resulting pressure signal through a special filter on both sides of the piston's TDC position in order to reduce the influence of other phenomena. It has proved advantageous that such a filter consist of two half Hanning filters on the respective sides of a filter section resulting in a uniform level between the two half Hanning filters. Simultaneous detection of vibrations from the cylinder makes it possible to establish a relationship between vibrations and pressure.

It thus becomes possible by complex spectrum analysis to ascertain a transfer function TF which in the module 7 can be applied to the vibration signal U obtained from the filter 6 in order to obtain a pressure signal P. Such a pressure measurement can be used to establish the transfer function TF for a given type of engine at, for example, various speeds and various loads, resulting in a TF matrix. On the basis of such measurements it then becomes possible, using vibration measurements only, to obtain a sufficient basis for pressure determination. The filter 6 described can be used to achieve reduced variation of TF, with consequently more reliable and more definite pressure determination.

Another possibility on the basis of the pressure measurements and vibration measurements described above is to carry out multivariate data analysis (MVDA) and hence establish relationships between vibration signals and pressure signals for a particular engine type at, for example, various engine speeds and various loads. On the basis of the data model thus obtained, it is then possible in the module 7 to use a vibration signal U in a specified operating situation as a starting point for establishing a pressure signal P.

Practical experiments have shown that it is desirable to use at least one vibration sensor 4 per cylinder. It has also been found advantageous, inter alia from the reproducibility point of view, to situate these sensors on bolts which secure the cylinder head 3 to the actual engine body. These bolts have been found to be most sensitive to pressure changes in the cylinder and least sensitive to other disturbances. Such a sensor location ensures good coupling with vibrations in the engine body. It is of course also possible to adopt other sensor locations as desired or necessary, as also other types of sensor than that here described.

Establishing and using according to the invention a relationship between vibrations and cylinder pressure makes it easy to ascertain by means of a suitable number of vibration sensors attached to the engine how the pressure in a cylinder changes with movement of the piston. The engine's condition can thus be monitored to enable any defects to be detected and dealt with at an early stage without complicated inspection and dismantling of the engine. As well as pressure levels, it is also possible to ascertain and analyse, for example, the rate of pressure change or the rate of heat release in a cylinder.

An arrangement as described above for determining the pressure in a cylinder can be fitted permanently to the engine or adjacent parts of the vehicle, advantageously together with evaluation equipment designed for the purpose, but it is of course also possible, for example, simply to fit vibration sensors to the engine and, where necessary, connect them to suitably designed evaluation equipment, e.g. in the vehicle concerned or in a workshop.

What is claimed is:

1. A method for determining the pressure in a cylinder of a combustion engine wherein a piston moves in the cylinder, the method comprising:

recording vibration of the engine during piston movement and obtaining a vibration signal, wherein the vibration signal is obtained in a region about the top dead center position of the piston moving in the cylinder at a transition of the piston in the cylinder from compression to expansion;

filtering the vibration signal a half Hanning filter before the piston top dead center position and with an exponential filter after the piston top dead center position, and thereafter converting the filter vibration signal to a pressure signal based on a relationship between vibration and pressure.

2. The method of claim 1, further comprising determining the position of the piston in the cylinder and the filtering with the half Hanning filter and with the exponential filter being based upon the determined position of the piston with respect to the top dead center position thereof.

3. The method of claim 1, wherein the half Hanning filter and the exponential filter each operates over a respective time window and the operating time window of the filters being selected so that the exponential filter forms a longer time window than the half Hanning filter so that processing of the vibration signal is longer in the exponential filter than in the half Hanning filter.

4. The method of claim 3, wherein the length of the half Hanning filter time window is in the range of 10–20% of the length of the exponential filter time window.

5. The method of claim 3, wherein the length of the half Hanning filter time window is in the range of about 15% of the length of the exponential filter time window.

6. The method of claim 3, wherein the filter has a time window before and after the piston top dead center position, and the filter time window before the piston top dead center position is the same length as the piston time window after the piston top dead center position.

7. The method of claim 1, wherein the filter has a time window before and after the piston top dead center position, and the filter time window before the piston's top dead center position is the same length as the piston time window after the piston top dead center position.

8. The method of claim 1, wherein the vibration signal is given a 0 value in the filter before the half Hanning filter.

9. The method of claim 1, further comprising determining the relationship between vibration and pressure by filtering a pressure signal about the piston top dead center position which pressure signal represents the actual pressure in a filter, and wherein the filter comprises two half Hanning filters on respective sides of a filter section for producing a uniform level between the two half Hanning filters before determining the relationship between pressure signal and vibration signal.

10. The method of claim 1, wherein each pressure determination based on a vibration signal involves use of a transfer function pertaining to a particular operating situation of the cylinder.

11. The method of claim 1, wherein each pressure determination based on a vibration signal involves using a relationship established by multivariate analysis pertaining to a particular operating situation of the cylinder.

12. Apparatus for determining the pressure in a cylinder of a combustion engine, wherein the combustion engine comprises at least one cylinder and a respective piston moveable in the cylinder through the cylinder toward and away from a respective top dead center position for the piston in the cylinder;

at least one vibration sensor at the engine for detecting vibration generated during movement of the piston in the cylinder;

a filter for filtering vibration signals obtained by the vibration sensor;

a module arranged after the filter which converts the filtered vibration signal to a pressure signal which represents the pressure in the cylinder based on a relationship between vibration and pressure in the cylinder;

the filter being positioned to act on the vibration signal during movement of the piston in the cylinder in a region about the top dead center position of the piston in the cylinder from compression to expansion, the filter comprising a half Hanning filter for acting upon the vibration signal before the piston top dead center position and an exponential filter for acting upon the vibration signal after the piston top dead center position.

13. The apparatus of claim 12, further comprising a detector for detecting the position of the piston in the cylinder and for detecting approach of the piston to and leaving of the piston from the top dead center position thereof for causing operation of the filter.

14. The apparatus of claim 12, wherein the exponential filter operates over a longer time window than the half Hanning filter.

15. The apparatus of claim 14, wherein the half Hanning filter has a longer time window in the range of 10–20% of a time window of the exponential filter.

16. The apparatus of claim 14, wherein the half Hanning filter has a longer time window in the range of about 15% of a time window of the exponential filter.

17. The apparatus of claim 12, wherein the filter includes a section preceding the half Hanning filter and the filter gives the vibration signal a value of 0 in the section preceding the half Hanning filter.

18. The apparatus of claim 12, wherein the filter has a time window before and after piston the top dead center position, and the filter time window before the piston top dead center position is the same length as the piston time window after the piston top dead center position.

19. The apparatus of claim 18, wherein the engine includes a crankshaft that is rotated with movement of the piston in the cylinder and the crankshaft has rotation degrees such that in crankshaft degrees, the filter is operative over an angle extending between about 60° on each side of the piston top dead center position of the crankshaft.

20. The apparatus of claim 12, wherein the engine has a cylinder head and has bolts which secure the cylinder head to the engine, and at least one of the vibration sensors is mounted on the bolt forming part of the engine.

* * * * *